United States Patent [19]

Hager

[11] Patent Number: 5,047,779
[45] Date of Patent: Sep. 10, 1991

[54] AIRCRAFT RADAR ALTIMETER WITH MULTIPLE TARGET TRACKING CAPABILITY

[75] Inventor: James R. Hager, Crystal, Minn.
[73] Assignee: Honeywell Inc., Minneapolis, Minn.
[21] Appl. No.: 574,586
[22] Filed: Aug. 28, 1990
[51] Int. Cl.$^5$ ............................................. G01S 13/18
[52] U.S. Cl. ................................... 342/120; 342/121; 342/122
[58] Field of Search ........................ 342/120, 121, 122

[56] References Cited

U.S. PATENT DOCUMENTS

| | | | |
|---|---|---|---|
| 3,739,379 | 6/1973 | Davis | 342/88 |
| 4,023,171 | 5/1977 | Stavis | 342/105 |
| 4,144,571 | 3/1979 | Webber | 364/450 |
| 4,174,520 | 11/1979 | Westby | 342/120 |
| 4,320,397 | 3/1982 | Constantinides | 342/82 |
| 4,698,635 | 10/1987 | Hilton et al. | 342/64 |
| 4,706,092 | 11/1987 | Magne | 342/109 |
| 4,758,839 | 7/1988 | Goebel et al. | 342/132 |
| 4,806,935 | 2/1989 | Fosket et al. | 342/120 |
| 4,894,659 | 1/1990 | Andrews | 342/121 |

Primary Examiner—John B. Sotomayor
Attorney, Agent, or Firm—Haugen and Nikolai

[57] ABSTRACT

An aircraft radar altimeter includes a programmed microcontroller which permits effective simultaneous tracking of at least two targets such that, for example, both ground and obstacles on the ground can be simultaneously tracked, thus avoiding crashes when the aircraft is operating at very low altitudes. The microcontroller is operatively coupled to the radar transmitter and to the receiver so that information relating to a first target can be stored away while a search and track operation is run on a second target. The information concerning a detected second target is likewise stored away and the microcontroller permits alternate tracking of the two targets with the stored information being used as the basis for establishing an initial position for a target when tracking of that target is resumed.

8 Claims, 3 Drawing Sheets

AIRCRAFT RADAR ALTIMETER WITH MULTIPLE TARGET TRACKING CAPABILITY

BACKGROUND OF THE INVENTION

I. Field of the Invention:

This invention relates generally to apparatus for measuring the altitude of an aircraft above the earth's surface, and more particularly to a radar altimeter having the capability of essentially simultaneously tracking both the earth's surface and obstructions, such as treetops or man-made objects, extending upward from said earth's surface.

II. Discussion of the Prior Art:

Radar systems are commonly used to implement altimeters for aircraft. Such an altimeter typically includes a transmitter for applying pulses of electromagnetic energy at regular intervals to an antenna which then radiates the energy towards the earth's surface. The altimeter further includes a signal receiver located in the aircraft for picking up echo or return signals reflected from the earth's surface. A closed loop servo tracker for measuring the time interval between the transmitted pulse and its associated return pulse also forms a part of the receiver. The interval is, of course, directly related to the altitude of the aircraft above sea level.

In a military environment, pilots are frequently required to fly missions where they must hug the ground to avoid detection by enemy radar. Prior art radar aircraft altimeters are generally incapable of distinguishing between the earth's surface, be it ground or water, and objects projecting upward from the earth's surface. Specifically, such prior art radar altimeters are incapable of distinguishing between treetops and ground or between man-made objects, such as bridges, towers, etc., and the earth's surface.

It is accordingly a principal object of the present invention to provide a radar altimeter capable of simultaneously tracking multiple targets on a time shared basis allowing both the earth's surface and obstructions projecting therefrom to be indicated on a radar display. This permits a pilot to more safely maneuver at low altitudes over treetops, bridges and mountainous terrain.

SUMMARY OF THE INVENTION

Simultaneous tracking of multiple targets by a radar altimeter is achieved in accordance with the present invention by providing a radar transmitter and a receiver on the aircraft where the transmitter emits pulses of electromagnetic energy at a predetermined repetition rate towards the earth's surface and the receiver picks up the return pulse signals from the earth's surface and from objects which may be extending upwardly from the earth's surface. Associated with the receiver is a closed loop servo tracker which is operative to determine from the time interval between transmitted pulses and the corresponding return pulse signals from the earth's surface, the altitude of the aircraft relative to the earth's surface. In addition to the delay or altitude information, the receiver monitors the amplitude of the return pulse signals and the rate of change of altitude. Forming a part of the tracking loop is a programmed microcontroller which periodically interrupts the tracking of the earth's surface and stores away in its memory the altitude, rate and amplitude information. The microcontroller also is programmed for adjusting the gain of the transmitter, causing it to emit higher energy pulses while the receiver searches for returns from objects or obstructions projecting upward from the earth's surface. When such returns are found, the programmed microcontroller reinitiates the tracker to lock onto the return signal from the object. Again, its altitude, rate and return signal strength are determined and stored in a memory at which point the information previously stored relating to the altitude, rate and return signal strength of the earth return is read out from the memory and used to control the tracker so that it will resume its tracking operation at the altitude and with the transmitter gain being adjusted by the level information related to the first target. The sequence is repeated at a sufficiently high frequency that both targets are effectively tracked until such time as the return from the second target, i.e., the projecting object is no longer present. At this time, the microcontroller switches back to the mode where only the earth's surface is being tracked while searching obstructions.

By providing two separate antennae, one being a wide beam downward focused antenna and the other being a narrow beam, high-gain forward-looking antenna and by time multiplexing the transmit/receive functions between the two, both altitude information and forward obstacle avoidance can be achieved.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
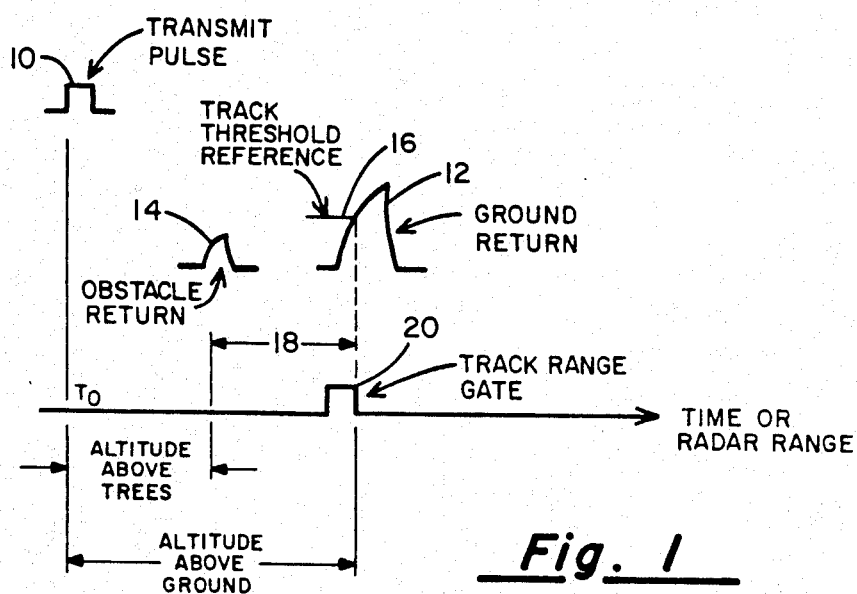
FIG. 1 is a signal waveform diagram helpful in understanding the operation of the present invention.

The invention described herein is a general altitude range tracking radar, i.e., range is measured and indicated by measuring the time for transmitted energy to be reflected from the surface and returned. With reference to FIG. 1, which pertains to the downward-looking system, the radar transmitter repeatedly sends out bursts of electromagnetic energy at a predetermined repetition rate from a relatively wide-beam antenna, as indicated by the transmit pulse 10. Following a time delay which is a function of the aircraft's altitude, a ground return pulse 12 is received by a receiving antenna feeding a receiver. A second return 14 from objects such as treetops may also be applied to the receiver input. If, as an example, the ground reflectivity is considerably greater than that of the treetops, and the aircraft has been flying over ground with no trees, a conventional radar would continue to track the ground as it flies over trees. This is due in part to the automatic transmit power level control maintaining the ground return at a nominal level, thereby reducing the low reflectivity treetop return 14 below the track reference level 16. Moreover, the range between the ground and the treetop return (interval 18) is sufficiently large so that a relatively narrow range gate 20 will never overlap the treetop return 14 while tracking the ground return 12 and, hence, the treetop return will not be reflected as a separate received signal. The present invention overcomes these two constraints by periodically interrupting the normal ground track for an insignificantly small time interval so as not to degrade the normal track operation and then searching a short distance above and below the main ground return 12. While performing this search operation on either side of the main return, the automatic transmit power level is disabled, providing maximum transmit power so that the return from the lower reflectivity treetops will cross the track threshold 16. If no secondary target is detected with the transmitter at full power, tracking is continued on the original target. If a secondary target, e.g., treetops, is detected, the two targets are tracked together on a time multiplexed basis.

Figure 2:
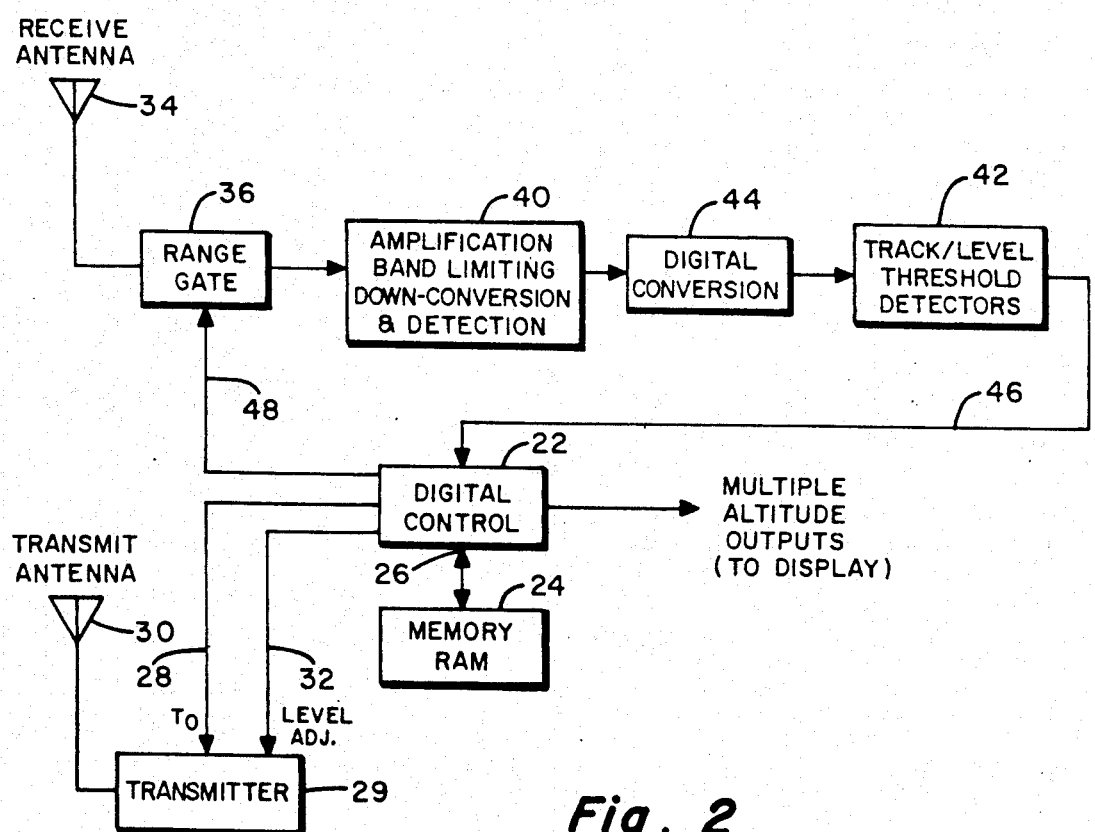
FIG. 2 is a block diagram of the radar altimeter multiple target tracking system of the present invention.

Having explained the general principals of the invention, reference is made to the block diagram of FIG. 2 which illustrates the components of a radar altimeter designed for multiple target tracking. Overall timing and control of the system is achieved by providing a digital control module 22 having a random access memory 24 coupled to the memory port 26 thereof. The digital controller 22 is coupled to the radar transmitter 29 via line 28 for establishing the time, $T_0$, at which transmit pulses 10 are generated and applied to the transmitting antenna 30. The digital controller 22 also has an output line 32 leading to the transmitter 29 for establishing the amplitude level or power of the transmitted signal. When a second target is being sought on either side of the main return, the automatic transmit power level control is disabled, thereby providing a maximum transmit power so that the return from the lower reflectivity target, e.g., treetops, will cross the track reference threshold 16.

After reflecting from the target, the return pulse is picked up by a receiving antenna 34 and is fed through a range gate 36 to the radar altimeter receiver shown enclosed by the broken line box 40. The receiver includes conventional amplification, band-limiting downconversion and peak detection circuitry well known to those skilled in the art. The resulting signal is then fed to an A/D converter 44 whose output, in turn, is applied to a threshold detector circuit 42 and a determination is made whether a target is present by establishing whether the return signal exceeds a prescribed threshold. A return meeting the prescribed criteria is then fed via bus 46 to the digital controller 22. An output from the digital controller on line 48 is applied to the range gate and used to align the range gate with the leading edge of a return pulse. The aircraft altitude, then, is directly proportional to the delay interval between the time that the transmitter 29 issues its output and the leading edge of the range gate pulse 20 (FIG. 1).

Figure 3:
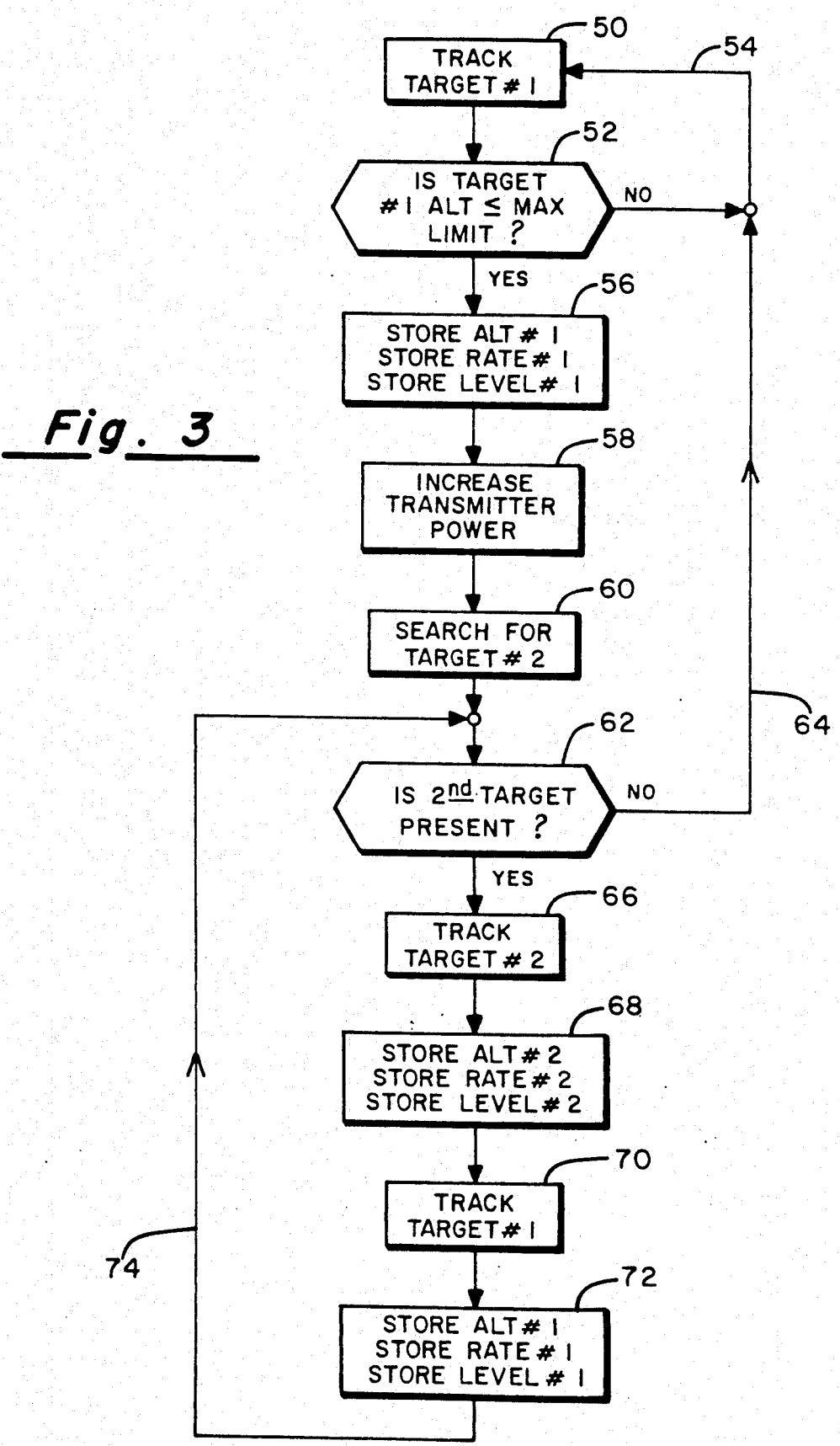
FIG. 3 is a flow chart illustrating the manner in which the system of FIG. 2 is controlled to provide the multiple target tracking capability.

Referring next to FIG. 3, there is shown a software flow diagram of the algorithm used by the digital controller 22 for tracking multiple targets. The operation can be considered as beginning when the closed loop tracker of the receiver operates to position the range gate in alignment with the leading edge of the strongest return, i.e., that reflected from ground. See block 50 in FIG. 3. Once a target is locked onto, a determination is made whether the aircraft is a greater distance (altitude) relative to ground than some predetermined minimum (block 52). If it is, there is no need to track a second target (treetops) because, presumably, the aircraft is at a high enough altitude that treetops or other obstructions are of no concern to the pilot. Thus, operation loops back via path 54 so that only target 1 (ground) is tracked. If, on the other hand, the indicated aircraft altitude is below some predetermined maximum limit, the digital controller 22 will undertake to store away the altitude of target 1 (ground), the rate in feet per second that the altitude of target 1 is changing and the signal level control voltage on line 32 which establishes the transmitter power for target 1 so that the receiver will appropriately respond. These three operations are represented by block 56 in FIG. 3.

Once the information concerning the ground return (target 1) has been stored away in RAM memory 24, the digital controller 22 provides a signal via line 32 to the transmitter 29 to effectively increase the power of the transmitter (block 58) to its maximum output. With the power at a prescribed amplitude, a search is made for a secondary target (block 60). If no secondary target is detected, control follows the path 64 and only target no. 1 is tracked. However, if decision block 62 reveals that a second target is present, the tracking loop in the receiver will function to position the range gate on the secondary return 14 and the transit time of the transmitted pulse from the transmitter to the secondary target (treetops, bridge, etc.) and back to the receiver will be measured (block 66). The altitude of target number 2, its rate of rise or fall and the power level needed to provide a constant amplitude output are stored in the RAM memory 24 (block 68). Once the foregoing information is so stored, the digital control 22 will again cause the receiver to track target no. 1 with the initial condition for altitude, rate and power level relating thereto being read out from the RAM memory and serving as a starting point for the resumption of tracking of target 1. Once target 1 is so tracked, the parameters including altitude, rate of rise and fall and transmitter power level will be stored and control loops back via path 74 to the input of decision block 62 where a decision is again made as to whether there is still a second target present.

It can be seen, then, that tracking of two targets is time shared so long as a second target is deemed to be present. The time shared mechanization results in the capability to search for a target while tracking the surface and then to track both targets simultaneously once two such targets are acquired. By indicating both the surface and obstructions, a pilot can safely maneuver at lower altitudes over treetops, bridges, mountain terrain, etc.

Figure 4:
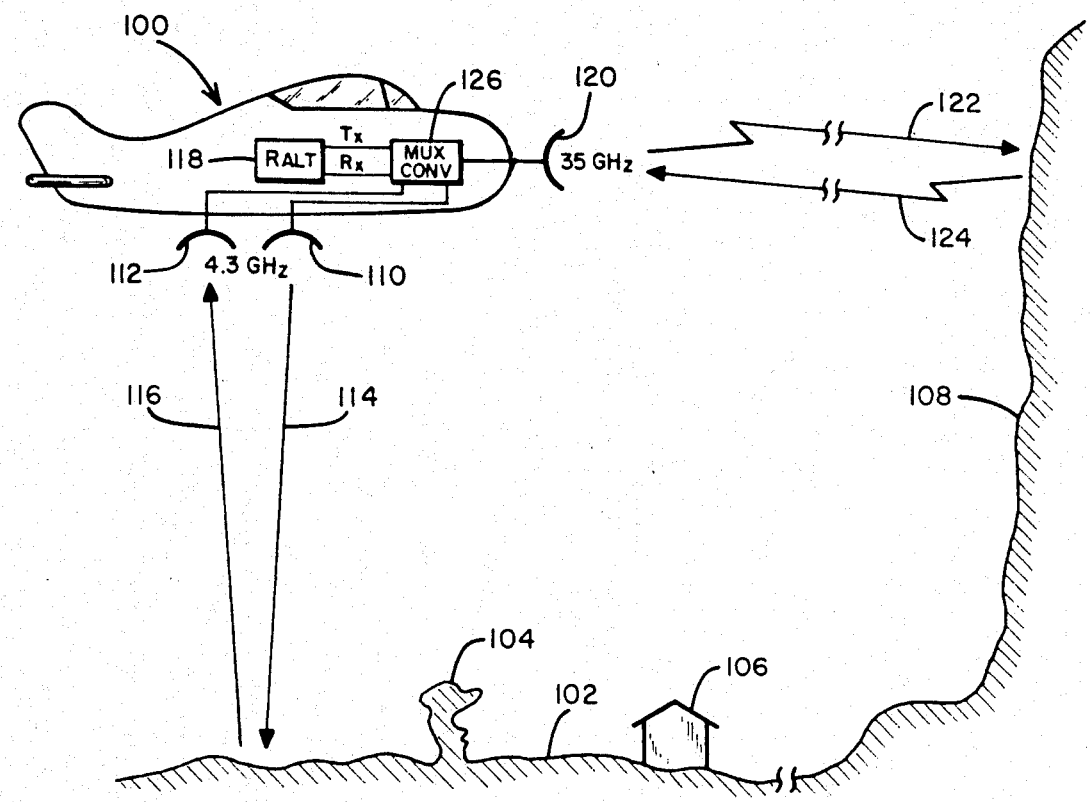
FIG. 4 illustrates the application of this invention to a radar altimeter with a forward-looking capability.
Figure 5:
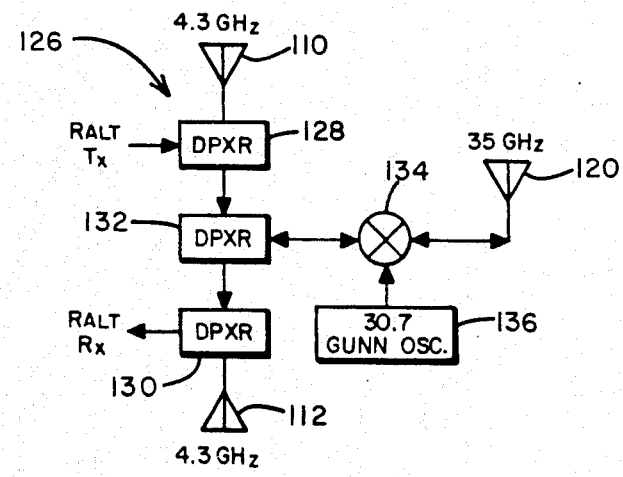
FIG. 5 is a schematic diagram illustrating the manner in which downward-looking and forward-looking radars can be multiplexed.

Referring next to FIGS. 4 and 5, it will be explained how the time multiplexing principles of the present invention can be extended so as to apply to a radar altimeter having a forward-looking obstacle avoidance capability. As illustrated in FIG. 4, an aircraft 100 is represented as flying over ground 102 having objects, such as trees 104 and buildings 106 extending upwardly therefrom. Located out ahead of the aircraft is an obstacle, such as a mountainside 108. The aircraft 100 is equipped with a downward looking, relatively wide beam transmitting antenna 110 and a similar receiving antenna 112. The path of the transmitted pulses from the downward looking antenna are represented by the arrow 114 while the path of the return signal is represented by arrow 116. The radar altimeter of FIG. 2 is located in the aircraft 100 and is represented by the box 118.

Also appropriately mounted on the aircraft is a forward-looking antenna 120 which is a relatively narrow beam design and it functions both as a transmitting antenna and a receiving antenna on a time-multiplexed basis. Again, the transmitted radar signals are represented by the arrow 122 and the echo or return signals from the forward-looking antenna are represented by the arrow 124.

To achieve the desired time-sharing between the transmitter electronics and the receiver electronics and between the forward-looking and downward-looking antennae, there is associated with the radar altimeter 118 a multiplexer/converter module 126. The construction and operation of that mux converter will now be explained with the aid of FIG. 5.

FIG. 5 illustrates the downward-looking transmitting antenna 110 and receiving antenna 112 as well as the forward-looking transmit/receive antenna 120. The transmitter 29 of FIG. 2 is adapted to be connected to the downward-looking antenna 110 through an electronic switch or duplexer 128 and, likewise, the receiving antenna 112 is adapted to be coupled to the range gate 36 of FIG. 2 by way of the duplexer 130. Duplexers 128 and 130 are also connected to a further duplexer 132 such that if the duplexer switches are appropriately positioned, the output of the radar altimeter transmitter 29 can be routed through duplexer 128 and duplexer 132 to the up converter or mixer 134 and through that device to the forwarding-looking transmit/receive antenna 120. The return signal 124 picked up by the antenna 120 will also be fed back through the converter 134 and through the duplexers 132 and 130 to the input to the range gate 36 of FIG. 2.

Those skilled in the art will appreciate that the size (diameter) of the antenna 120 is a function of the wavelength of the transmitted and receive signals and that because of the constraints of where such an antenna may be placed on an aircraft, there is a practical limit to the physical size that the antenna may assume. By providing the up converter 134, it is possible to obtain a narrow beam width from the antenna 120 while maintaining that antenna a reasonable size. For example, if a beam width of 3° is desired, it can be accomplished with a 7.5" diameter antenna, provided the transmitting frequency is 35 GHz. The downward-looking transmitting and receiving antennas 110 and 112 should preferably provide a beam width of about 40° which corresponds to a frequency of 4.3 GHz. A 4.3 GHz transmitter can then be used, provided the up converter includes a local oscillator 136 operating at a frequency of 30.7 GHz. It is possible to realize such an oscillator using a Gunn diode as the active element thereof.

The duplexers 128, 130 and 132 are under control of the digital control 22 of FIG. 2 such that following the generation of a transmitter output from the downward-looking transmitting antenna 110, a switch-over of the duplexers will occur such that the return signal picked up by the receive antenna 112 will be fed through the duplexer 130 to the receiver electronics. Likewise, following the delivery of a transmit pulse through the duplexers 128, 132, the mixer 134 to the transmitting antenna 120, the digital control 22 is effective to switch over the duplexers 132 and 130 such that the return echo picked up by the antenna 120 will be fed through the mixer 134, the duplexer 132 and the duplexer 130 to the receive electronics.

The system of the present invention can, hence, be used for tracking multiple targets where the targets are located more or less directly below the aircraft or where one target is below the aircraft and the other is forward of the aircraft. It should also be understood that there are various other ways of implementing the mux/converter 126 other than as is shown in FIG. 5 and limitation to only that arrangement shown in FIG. 5 is not intended. For example, rather than employing a single up converter 134, a local oscillator may be coupled to separate mixers, one for the transmitting channel and one for the receive channel where the forward-looking antenna 120 would be coupled to a duplexer used to route the transmit pulses to the antenna and the received pulses back through its down converter to the receiver channel.

This invention has bee described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A radar altimeter multiple target tracking system comprising:
    (a) means for repeatedly transmitting pulses of electromagnetic energy at a predetermined power level from an aircraft towards the earth's surface;
    (b) means for receiving return pulse signals from said surface and from objects extending upward from said surface;
    (c) closed-loop tracking means including a range gate coupled to said receiving means for determining from the time interval between transmitted pulses and the position of said range gate when overlapping the leading edge of the corresponding return pulse signals from said earth's surface the altitude of said aircraft relative to said earth's surface;
    (d) means for periodically interrupting said closed-loop tracking means and storing said altitude and power level information in a memory while searching for returns from said objects, if any;
    (e) means for resuming operation of said closed-loop tracking means for tracking said return signal from said object and determining from the time interval between transmitted pulses and the position of said range gate when overlapping the leading edge of the corresponding return pulse signals from said object the altitude of said aircraft relative to said object;
    (f) means for storing the altitude and power level information relative to said object in said memory; and
    (g) means for alternately reading out the contents of said memory means to said tracking means whereby tracking of said return pulse signals from the earth's surface and said object are interleaved and resumed from an altitude and at a power level value stored in said memory.

2. The radar altimeter multiple target tracking system as in claim 1 wherein said means for storing also stores the rate of change of altitude of said aircraft relative to said earth's surface and said object.

3. The radar altimeter as in claim 1 and further including means for adjusting the power level of said transmitted pulses.

4. The radar altimeter as in claim 3 wherein said power level is adjusted to a relative maximum when searching for returns from said object.

5. The radar altimeter as in claim 1 wherein said means for periodically interrupting said tracking means is a programmed microcontroller.

6. The radar altimeter as in claim 5 wherein said means for storing is a random access memory operatively coupled to said microcontroller.

7. The radar altimeter multiple target tracking system as in claim 1 wherein said means for repeatedly transmitting pulses includes:
 (a) a downward focused, relatively wide beam transmitting antenna;
 (b) a forward focused, relatively narrow beam antenna; and
 (c) means for alternatively coupling pulses of a first, relatively low frequency to said wide beam transmitting antenna and pulses of a second, relatively high frequency to said narrow beam antenna on a time-shared basis.

8. The radar altimeter multiple target tracking system as in claim 7 wherein said means for receiving return pulse signals includes:
 (a) radar receiving means;
 (b) frequency converting means;
 (c) a downward focused, relatively wide beam receiving antenna; and
 (d) means for alternatively coupling return pulses of said first frequency from said wide beam receiving antenna to said radar receiving means and return pulses of said second frequency through said converting means to said radar receiving means.

* * * * *